United States Patent [19]

Habu et al.

[11] 4,007,163

[45] Feb. 8, 1977

[54] METHOD FOR HARDENING GELATIN

[75] Inventors: Teiji Habu; Shinobu Koremotsu; Tsuneo Wada; Takashi Sasaki; Masayuki Matsumoto, all of Hino, Japan

[73] Assignee: Konishiroku Photo Industry Co., Ltd., Tokyo, Japan

[22] Filed: Mar. 31, 1975

[21] Appl. No.: 563,529

[30] Foreign Application Priority Data

Apr. 1, 1974 Japan .............................. 49-37247

[52] U.S. Cl. ................................ 260/117; 96/111; 106/125
[51] Int. Cl.² ......................................... C09H 7/00
[58] Field of Search ................... 260/117; 106/125; 96/111

[56] References Cited

UNITED STATES PATENTS

| 2,726,162 | 12/1955 | Allen et al. ..................... 260/117 X |
| 2,816,125 | 12/1957 | Allen et al. ..................... 260/117 X |
| 2,994,611 | 8/1961 | Heyna et al. .................... 260/117 X |
| 3,642,486 | 2/1972 | Burness et al. ................. 260/117 X |
| 3,642,908 | 2/1972 | Burness et al. ................. 260/117 X |
| 3,687,707 | 8/1972 | Graham .......................... 260/117 X |
| 3,721,564 | 3/1973 | Velter et al. .................... 260/117 X |
| 3,834,902 | 9/1974 | Wright ........................... 260/117 X |

Primary Examiner—Paul R. Michl
Attorney, Agent, or Firm—Bierman & Bierman

[57] ABSTRACT

A method for hardening gelatin is disclosed wherein the gelatin is treated with a hardener which contains a combination of two compounds. One of the compounds contains at least two meslyoxy groups in the molecule while the second compound contains at least two vinylsulfonyl groups in the molecule.

7 Claims, No Drawings

METHOD FOR HARDENING GELATIN

This invention relates to a method for hardening gelatin using a hardener, particularly to a gelatin-hardening method suitable for hardening gelatin layers of light-sensitive silver halide photographic materials.

Generally, light-sensitive silver halide photographic materials are prepared by forming various layers such as silver halide emulsion layers, filter layers, inter layers, protective layer, sub layers, antihalation layers, etc, on a suitable support such as a glass plate, paper or synthetic resin film. Since these layers are socalled gelatin layers composed mainly of gelatin, the physical properties of these layers are dependent chiefly upon those of gelatin. However, gelatin is characterized as having a low melting point, high water-swellability and inferior mechanical strength. These properties are undesirable for the layers of light-sensitive silver halide photographic materials. In order to improve the physical properties of gelatin, various hardeners have heretofore been applied to gelatin to cause a crosslinking reaction with amino, carboxyl, amide or similar functional group in the molecules of gelatin. For example, well known are inorganic hardeners, there have been known from old time inorganic hardners composed of polyvalent metal salts such as chromium salts (ie, chromium alum and chromium chloride) or aluminum salts and organic hardners such as formalin, glyoxal, acrolein and their derivatives. When viewed from a photographic standpoint however, said hardeners have many disadvantages. For example, they cause strong desensitization, accelerate fogging, reduce the color-forming ability of couplers in photographic emulsions, or are impractical because their hardening action is insufficient. Some of the hardeners have an excessively rapid hardening action which renders it difficult to produce light-sensitive silver halide. In some of the hardeners, the desired hardening effect is obtained only after a long period of time. Moreover, since it desirable to process photographic materials at high speed, photographic materials and developers are being improved to speed up the processing. For example, in order to make the penetration of the processing solution faster, photographic materials are made thinner by increasing the amount of silver halide and decreasing the amount of gelatin. This results in an increase in fog with a corresponding deterioration of the physical properties of the layers. In addition, with the recent spread of automatic processing machines, photographic materials are required to have a high degree of mechanical strength in order to withstand severe mechanical abrasion. With the spread of high temperature short-period processing, using strong processing solutions, they are required to be stronger in film properties without degrading the photographic properties of films are deteriorated. In addition thereto, with recent spread of automatic processing machines, photographic materials are required to have mechanical strength at high degree so as to be with standable to severe mechanical abrasion, and with spread of high-temperature short-period processing using strong processing solutions, they are required to be stronger in film properties without degradation in photographic properties.

As the result of such rapid processing of photographic materials, most of the compounds which have been known as excellent hardeners exhibit various disadvantages. For example, if the amount of the hardener added to a photographic material is increased in order to make a gelatin with superior film properties, the photographic material is desensitized and there is an increase in fog. In addition, the covering power of the gelatin is deteriorated. Even if a photographic film in which gelatin is sufficiently hardened is obtained, the film will be so brittle that it becomes difficult to apply the photographic film to an automatic processing machine.

An object of the present invention is to provide a hardener which overcomes the above-mentioned disadvantages. Another object of the invention is to provide a method for hardening gelatin by the use of a hardener which is particularly suitable for the hardening of gelatin layers of light-sensitive silver halide photographic materials.

The above objects are accomplished by using as the hardener, a combination of a compound having at least two mesyloxy groups ($CH_3SO_3-$) in the molecule with a compound having at least two vinylsulfonyl groups in the molecule. By the use of such a combination, gelatin layers of photographic materials can successfully be hardened without desentization or increased fogging, even in the case where the photographic material is made thinner by decreasing the amount of gelatin. Further, even when the photographic material is subjected to high temperature processing using strong processing solutions, the combination of said compounds displays excellent and rapid hardening and is capable of withstanding high temperature processing and mechanical abrasion without exhibiting increased fogging.

In the event the hardener is incorporated into a coating liquid for forming a gelatin layer, the desired hardening occurs immediately after the coating. The so-called post-hardening effect, due to spontaneous incubation or heat treatment, is significantly reduced. It is therefore possible to produce a light sensitive silver halide photographic material having excellent stability. The present combination produces a synergistic effect with respect to hardening. This effect is an unexpected result of the combination and is not apparent from the use on the compounds individually.

The compounds having at least two mesyloxy groups in the molecule are described, for example, in U.S. Pat. Nos. 2,726,162, 2,816,125 and Italian Pat. No. 574,739. Examples of said compounds are listed below. These compounds can be synthesized according to the methods described in the above mentioned U. S. Patents.

(1-1) $CH_3SO_3CH_2CH_2OSO_2CH_3$
(1-2) $CH_3SO_3CH_2CH_2CH_2OSO_2CH_3$
(1-3) $CH_3SO_3CH_2CH_2CH_2CH_2CH_2CH_2OSO_2CH_3$
(1-4) $CH_3SO_3CH_2CH_2CH_2CH_2CH_2CH_2CH_2CH_2OSO_2CH_3$
(1-5) $CH_3SO_3CH_2CH_2CH_2CH_2CH_2CH_2CH_2CH_2CH_2OSO_3CH_3$
(1-6) $CH_3SO_3CH_2CH_2OCH_2CH_2OSO_2CH_3$
(1-7) $CH_3SO_3CH_2CH_2-\underset{\underset{CH_3}{|}}{N}-CH_2CH_2OSO_2CH_3$
(1-8) $CH_3SO_3CHCH_2OSO_2CH_3$ with $CH_3$ branch
(1-9) $CH_3SO_3CH_2CH=CHCH_2OSO_2CH_3$
(1-10) $CH_3SO_3CH_2C\equiv CCH_2OSO_2CH_3$
(1-11) $CH_3SO_3CH_2CH_2SCH_2CH_2OSO_2CH_3$
(1-12) $CH_3SO_3CH_2CH_2SCH_2CH_2OSO_2CH_3$
  $\downarrow$
(1-13) $CH_3SO_3CH_2CH_2SO_2CH_2CH_2OSO_2CH_3$ (I-14) 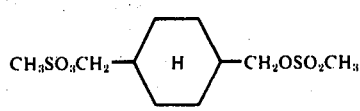
(I-15) 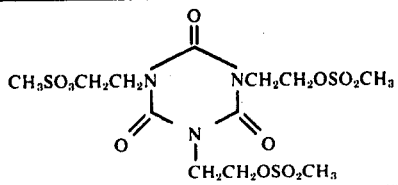
Representative examples of the compounds having at least two vinylsulfonyl groups in the molecule are shown below.
(II-1) $CH_2=CHSO_2CH_2CH_2SO_2CH=CH_2$
(II-2) $CH_2=CHSO_2CH_2CH_2CH_2CH_2SO_2CH=CH_2$
(II-3) 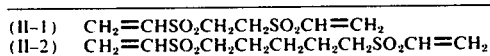
(II-4) 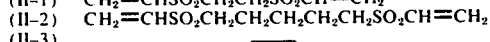
(II-5) 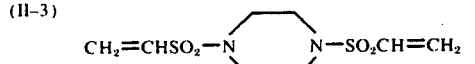
(II-6) 
(II-7) 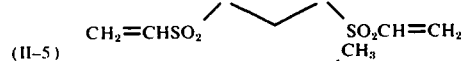
(II-8) 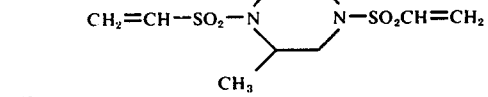
(II-9) 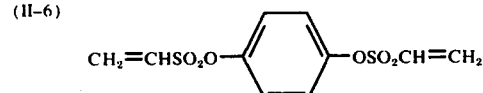
(II-10) 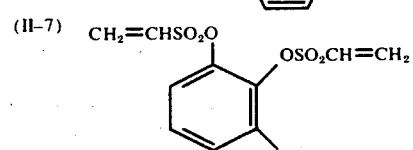
(II-11) 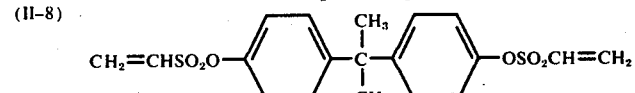
(II-12) 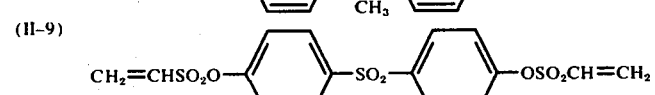
(II-13) 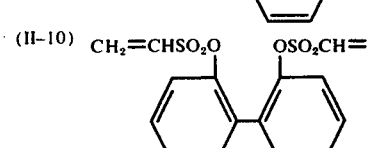 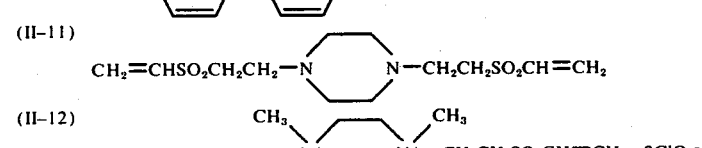 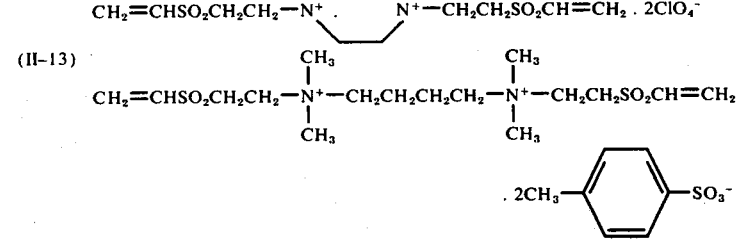

-continued
(II-14) CH₂=CHSO₂CH₂CH₂SO₂CH₂CH₂SO₂CH=CH₂
(II-15) CH₂=CHSO₂CH₂CH₂OCH₂CH₂NHCONHCH₂CH₂OCH₂SO₂CH=CH₂
(II-16) CH₂=CHSO₂CH₂CH₂OCH₂CH₂OCH₂SO₂CH=CH₂
(II-17) CH₂=CHSO₂CH₂CH₂OCH₂CH₂CH₂CH₂OCH₂SO₂CH=CH₂
(II-18) 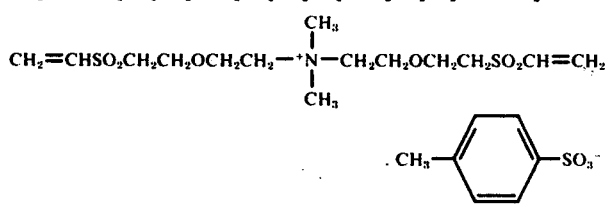
(II-19) 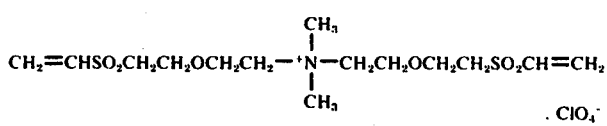
(II-20) 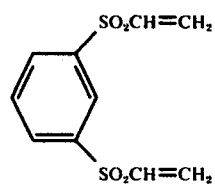
(II-21) 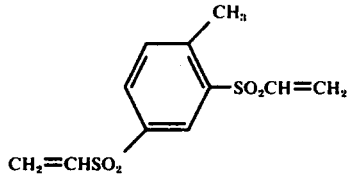
(II-22) 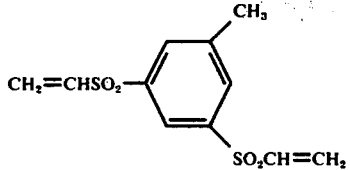
(II-23) 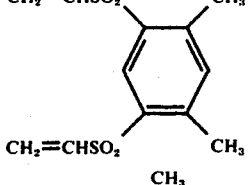
(II-24) 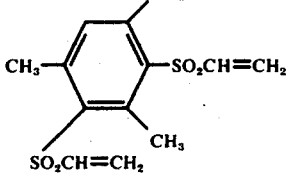
(II-25) 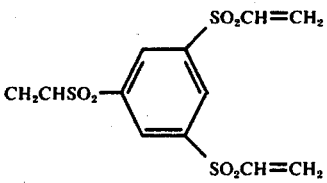
(II-26) 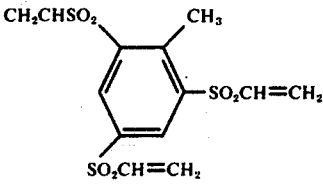

-continued
(II-27) 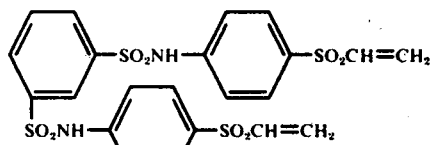
(II-28) 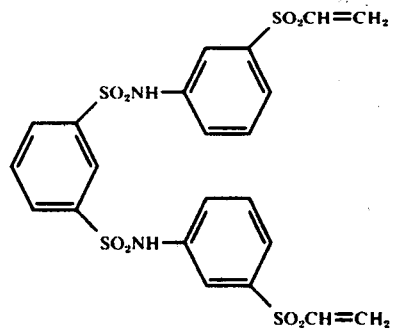
(II-29) 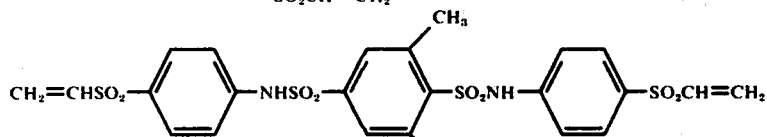
(II-30) 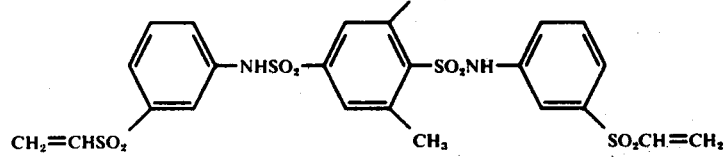
(II-31) CH₂=CHSO₂CH=CH₂
(II-32) 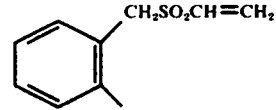
(II-33) 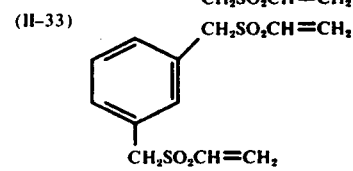
(II-34) 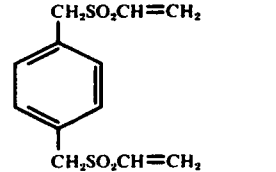
(II-35) 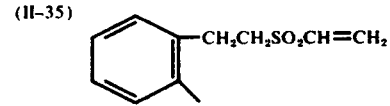
(II-36) 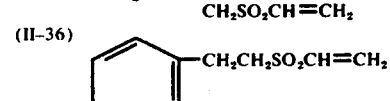
(II-37) 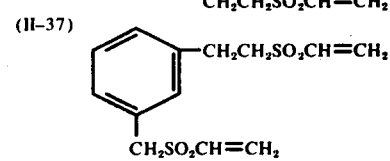

-continued (II-38) 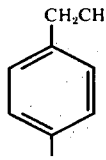

(II-39) 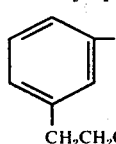

(II-40) 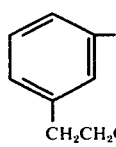

(II-41) 

(II-42) 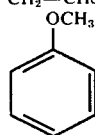

(II-43) 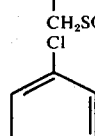

(II-44) 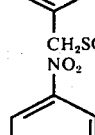

(II-45) 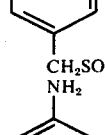

The above mentioned compounds can be synthesized according to the methods described in West German Pat. No. 1,100,942, U.S. Pat. No. 3,490,911 and Japanese Pat. Publication No. 8736/1972. The compound having at least two vinylsulfonyl groups includes a compound having a group with one $-SO_2-$ group bonded to two vinyl groups. For the purposes of the present invention this is considered equivalent to two vinylsulfonyl groups. This compound is exemplified by compound II-31.

The term "gelatin" used in the present invention means not only gelatin per se but also various gelatin derivatives. As gelatin derivatives, there can be mentioned, for example, acylated gelatin, guanidylated gelatin, carbamylated gelatin, cyanoethylated gelatin and esterified gelatin.

For hardening gelatin layers of a light sensitive silver halide photographic material, the hardener may be incorporated into any of the gelatin layers. Examples of such layers are sub layer, emulsion layers, inter layers, protective layer and backing layers. Alternatively, the photographic material having some of said layers may be immersed in a solution incorporated with the hardener. It is also possible to harden the gelatin layers of the photographic material at the time of development as well as before or after the development by use of any type of bath containing the hardener. In the above cases, the hardener may be used in combination with other hardeners in such an amount as not to reduce the effect of the present invention.

In incorporating the hardener according to the present invention in any of the photographic layers of a light-sensitive silver halide photographic material, the hardener is dissolved in water or one or more conventional organic solvents. Such solvents include methanol, dimethylformamide and ketones. The resulting solution is added to a coating liquid for forming the photographic layer. It is also possible to overcoat the outer-most layer of the photographic layers with the above mentioned solution.

The amount of the hardener added to a coating liquid for forming a gelatin layer varies depending on the type of layer and the desired physical and photographic properties of the gelatin layer. Usually the amount is 0.01 to 100% by weight, preferably 0.1 to 10% by weight, based on the dry weight of gelatin in the coating liquid. In this case, the amounts of the compounds constituting the hardener vary depending on the kind and desired properties of the gelatin layer. It is preferred that the amount of either one of the compounds is at least 10% by weight of the total amount of the compounds.

The hardener may be added at any stage during preparation of the coating liquid for forming the gelatin layer. With respect to a silver halide emulsion for example, the hardener is preferably added after second ripening of the emulsion.

The light-sensitive silver halide photographic materials contemplated by the present invention, may be any black-and-white, color and pseudo-color photographic material. This includes all negative, positive and diffusion transfer-type photographic materials for general use and for printing, X-ray, radiation, etc.

Silver halide emulsions used in the above-mentioned light-sensitive silver halide photographic materials may contain, as the photosensitive component, all silver halides. Examples of the silver halide include silver chloride, silver iodide, silver bromide, silver iodobromide, silver chlorobromide, silver chloroiodobromide. Further, the emulsions may be subjected either to chemical sensitization such as noble metal sensitization using noble metals such as ruthenium, rhodium, palladium, irridium, platinum, gold, etc., which include, for example, ammonium chloropalladate, potassium chloroplatinate, potassium chloropalladite and potassium chloroaurate; sulfur sensitization using sulfur compounds; reduction sensitization using stannous salts or polyamines; and sensitization using polyalkylene oxide type compounds, or to optical sensitization using cyanine dyes, merocyanine dyes or compounded cyanine dyes. Still further, the emulsions may be incorporated with various couplers such as colorless couplers, colored couplers or development inhibitor-yielding couplers; stabilizers such as mercury compounds, triazole type compounds, azaindene type compounds, benzothiazolium type compounds or zinc compounds; wetting agents such as dihydroxyalkanes; film property-improvers composed of water-dispersible particulate high polymers obtained by the emulsion polymerization of alkyl acrylate or alkyl methacrylate-acrylic or methacrylic acid copolymers, styrene-maleic acid copolymers or styrene-maleic anhydride half alkyl ester copolymers, coating sids such as polyethylene glycol lauryl ethers; and other various photographic additives.

Furthermore, hydrophilic colloids, which are advantageously used for the preparation of the emulsions, include gelatin, colloidal albumin, agar, gum arabic, dextran, alginic acid, cellulose derivatives such as cellulose acetate hydrolyzed to an acetyl content of 19 to 26%, polyacrylamides, imidated polyacrylamides, zein, vinyl alcohol polymers containing urethane-carboxylic acid groups or cyanoacetyl groups, such as vinyl alcoholvinyl cyanoacetate copolymers, polyvinyl alcohols, polyvinyl pyrrolidones, hydrolyzed polyvinyl acetates, polymers obtained by the polymerization of proteins or saturated acylated proteins with monomers having vinyl groups, polyvinyl pyridines, polyvinyl amines, polyaminoethyl methacrylates and polyethyleneimines. These hydrophilic colloids are also used to form photographic layers other than an emulsion layer of photographic materials. Example of these layers include inter layers, protective layers, filter layers, backing layers, etc.

As supports for the light-sensitive silver halide photographic materials, there may be used films composed of polyethylene terephthalates, polycarbonates, polystyrenes, polypropylenes or cellulose acetate, or baryta or polyethylene-laminate papers.

When applied to gelatin layers of light-sensitive silver halide photographic materials, the hardener according to the present invention exhibits its effective hardening ability without deteriorating the photographic properties (i.e. speed, etc.) of the photographic emulsion layers. Since the hardening action occurs rapidly without substantial post-hardening, it is possible to obtain stable, high quality photographic materials. Moreover, even when the photographic materials are stored over a long period of time, the presence of the hardener does not result in deterioration of the photographic emulsion layers. In fact, the hardener makes the layers more stable. In addition, it imparts excellent hardness capable of sufficiently withstanding high temperature, rapid and automatic processing.

The following examples are for illustrative purposes only and are not meant to limit or redefine the scope of the present invention.

EXAMPLE 1

A silver iodobromide-gelatin emulsion containing 1.7 mole % of silver iodide was incorporated with a gold sensitizer and subjected to second ripening. Thereafter, the emulsion was charged with 4-hydroxy-6-methyl-1, 3, 3a, 7-tetrazaindene, and then equally divided into four emulsions. One of these emulsions was coated on a polyester film base and then dried to prepare a control sample. One of the remaining emulsions was individually incorporated with a methanol solution of compound (I-2) in an amount of $1 \times 10^{-4}$ mole per gram of the gelatin in the emulsion. Another emulsion was individually incorporated with a methanol solution of compound (II-1) in an amount of $1 \times 10^{-4}$ mole per gram of the gelatin in the emulsion. The remaining emulsion was incorporated with a methanol solution of a mixture of the compounds (I-2) and (II-1), each in an amount of $0.5 \times 10^{-4}$ mole per gram of the gelatin in the emulsion. These three emulsions were individually coated on a polyester film base and then dried to prepare three samples.

The thus prepared control sample and three samples were measured in film hardness according to the following process:

Each sample was incubated at a temperature of 25° C. and a relative humidity (RH) of 55% for each of 1 day (24 hours), 15 days and 30 days. Thereafter, the sample was immersed in a 1.5% aqueous sodium hydroxide solution kept at 50° C. and the time required for initiation of dissolution of the gelatin film of the sample was measured. On the other hand, each sample, which had been incubated under the above conditions, was immersed for 3 minutes in a 3% aqueous sodium carbonate solution at 25° C. Immediately thereafter, the surface of the gelatin film of the sample was rubbed and then scratched with a sapphire needle having a pin point of 1 mm. in radius. The load (g) required for initiation of formation of scratch on the film surface was measured and represented as a film strength. Separately, each sample, which had been incubated at 25° C. and 55% RH for 1 day, was exposed according to the method described in JIS, developed at 40° C. for 30 seconds with an ordinary high temperature rapid processing developer containing hydroquinone and phenidone as developing agents, and then measured in speed and fog. the results obtained in the above cases are shown in Table 1. The speed is a relative value measured by assuming the speed of the control sample is 100.

pounds used as the hardeners were replaced by the compounds (I-6) and (II-4). Each sample was measured in flim hardness and photographic properties according to the same procedures as in Example 1. The results obtained are shown in Table 2. The speed is a relative value measured by assuming the speed of the control sample is 100.

Table 2

| | Film hardness characteristics | | | | | | Photographic properties | |
|---|---|---|---|---|---|---|---|---|
| | Dissolution initiation time (min) After incubation for | | | Film strength (g) After incubation for | | | | |
| Compound | 1 day | 15 days | 30 days | 1 day | 15 days | 30 days | Speed | Fog |
| — | 0.5 | 0.6 | 0.8 | 5 | 10 | 15 | 100 | 0.10 |
| Compound (I-6) | 3 | 4 | 8 | 58 | 93 | 100 | 98 | 0.10 |
| Compound (II-4) | 5 | 11 | 18 | 150 | 200 | 260 | 97 | 0.09 |
| Compound (I-6) Compound (II-4) | 10.5 | 14 | 16 | 175 | 230 | 260 | 97 | 0.09 |

As is clear from Table 2, the combination of the two compounds according to the present invention shows rapid and excellent hardening action, without deterioration of the photographic properties.

EXAMPLE 3

A green-sensitive high speed color photographic silver iodobromide-gelatin emulsion containing 3 mole % of silver iodide was subjected to second ripening, and then incorporated with 1-(4'-phenoxy-3'-fulfophenyl)-3-heptadecyl-5-pyrazolone as a magenta coupler. Thereafter, the emulsion was equally divided into four emulsions. One of these emulsions was coated as it was on a cellulose triacetate film base and then dried to prepare a control sample. Two of the remaining emul- Table 1

| | Film hardness characteristics | | | | | | Photographic properties | |
|---|---|---|---|---|---|---|---|---|
| | Dissolution initiation time (min) After incubation for | | | Film strength (g) After incubation for | | | | |
| Compound | 1 day | 15 days | 30 days | 1 day | 15 days | 30 days | Speed | Fog |
| — | 0.5 | 0.6 | 0.8 | 5 | 10 | 15 | 100 | 0.10 |
| Compound (I-2) | 1 | 3 | 5 | 45 | 85 | 105 | 99 | 0.10 |
| Compound (II-1) | 2 | 5 | 10 | 120 | 170 | 200 | 97 | 0.09 |
| Compound (I-2) Compound (II-1) | 5 | 9 | 16 | 180 | 200 | 260 | 96 | 0.09 |

As is clear from Table 1, the combination of the two compounds according to the present invention shows extremely rapid and excellent hardening action without deterioration of the photographic properties.

EXAMPLE 2

A control sample and three samples were prepared in the same manner as in Example 1, except that the comsions were individually incorporated with each of methanol solutions of the compounds (I-13) and (II-20), respectively, in an amount of $1 \times 10^{-4}$ mole per gram of the gelatin in each emulsion. The remaining emulsion was incorporated with a methanol solution of a mixture of the compounds (I-13) and (II-20), each in an amount of $0.5 \times 10^{-4}$ mole per gram of the gelatin in the emulsion. These three emulsions were individually coated on a cellulose triacetate film base to prepare three samples.

The film hardness characteristics of each sample were measured according to the same procedures as in Example 1. Further, the photographic properties of each sample were measured in such a manner that the sample was subjected to color development using a color developer containing diethyl-p-phenylenediamine as a developing agent, and the developed sample was subjected to ordinary bleaching, fixing and water-washing and then to sensitometry to measure the speed and fog thereof. The results obtained are shown in table 3. The speed is a relative value measured by assuming the speed of the control sample is 100.

Table 3

| Compound | Film hardness characteristics | | | | | | | |
|---|---|---|---|---|---|---|---|---|
| | Dissolution initiation time (min) After incubation for | | | Film strength (g) After incubation for | | | Photographic properties | |
| | 1 day | 15 days | 30 days | 1 day | 15 days | 30 days | Speed | Fog |
| — | 0.5 | 0.7 | 0.8 | 5 | 10 | 15 | 100 | 0.12 |
| Compound (I-13) | 8 | 16 | 19 | 105 | 118 | 125 | 99 | 0.11 |
| Compound (II-20) | 5 | 11 | 17 | 110 | 160 | 200 | 98 | 0.11 |
| Compound (I-13) Compound (II-20) | 12 | 18 | 20 | 160 | 180 | 220 | 96 | 0.11 |

As is clear from Table 3, it is confirmed that the combination of two compounds according to the present invention shows extremely rapid hardening action, and does not disturb the color formation of the coupler nor form any color stains.

What we claim is:

1. A method for hardening gelatin, which comprises treating the gelatin with the combination of a compound having at least two mesyloxy groups in the molecule with a compound having at least two vinylsulfonyl groups in the molecule.

2. The method of claim 1, wherein said mesyloxy group-bearing compound is any one of the exemplified compounds (I – I) to (I – 15) as described in the specification and said vinylsulfonyl group-bearing compound is any one of the exemplified compounds (II – 1) to (II – 45) as described in the specification.

3. The method of claim 1, wherein said gelatin is that which exists in a gelatin-containing photographic layer of a light-sensitive silver halide photographic material.

4. The method of claim 1 wherein said compound is incorporated into a processing liquid which is brought into contact with a gelatin-containing layer of an exposed light-sensitive silver halide photographic material.

5. The method of claim 1, wherein said gelatin is that which exists in a gelatin-containing liquid capable of forming a photographic layer of a light-sensitive silver halide photographic material.

6. The method of claim 1, wherein said hardener combination is used in the amount of from 0.01 to 100% by weight, based on the dry weight of the gelatin, either one component of said combination comprising at least 10% by weight of said combination.

7. A modified gelatin which is obtained by the method of claim 1.

* * * * *